United States Patent [19]

Wu

[11] Patent Number: 5,941,327
[45] Date of Patent: Aug. 24, 1999

[54] ELECTRIC CART WITH TWO PIECE CHASSIS

[76] Inventor: Donald P.H. Wu, No. 169, Ken Tzu Ku, Shang Ken Tsun, Hsin Feng Hsiang, Hsinchu Hsien, Taiwan

[21] Appl. No.: 08/947,395

[22] Filed: Oct. 8, 1997

[51] Int. Cl.⁶ .................................................. B60K 1/00
[52] U.S. Cl. ........................................ 180/65.1; 180/311
[58] Field of Search ..................... 180/60, 65.1, 89.13, 180/94, 311, 312, 908; 296/190.05, 190.06, 204

[56] References Cited

U.S. PATENT DOCUMENTS

| | | | |
|---|---|---|---|
| 3,754,615 | 8/1973 | McIndoo et al. | 180/311 |
| 4,013,136 | 3/1977 | Fear | 180/89.13 |
| 5,098,018 | 3/1992 | Aadar et al. | 180/89.13 |
| 5,259,635 | 11/1993 | Picker | 280/250.1 |
| 5,480,001 | 1/1996 | Hara | 180/311 |

*Primary Examiner*—Richard M. Camby
*Attorney, Agent, or Firm*—Pro-Techtor International Services

[57] ABSTRACT

An electric cart includes a first chassis member having a pivot axle fixed thereon and a second chassis member having two spaced recesses formed thereon to rotatably receive the pivot axle therein so as to form a rotatable coupling therebetween. An upright post is fixed on the first chassis member to support thereon a seat. Two spaced lugs is provided on the post. The second chassis member has an upright rod to support thereon an abutting member having an end sized to be received between the lugs. A cushion pad may be fixed to the end of the abutting member to provide a non-direct cushioned contact engagement between the upright post and the abutting member. The weight of the chassis members rotates the chassis members about the pivot axle in a direction to force the end of the abutting member to abut against the post. A steering system is provided on the first chassis member, including a handle stem rotatably mounted to the first chassis member to mechanically couple to at least one wheel rotatably supported on the first chassis member for steering the wheel. The second chassis member has a motor thereon to drive wheels mounted on the second chassis member.

13 Claims, 15 Drawing Sheets

ELECTRIC CART WITH TWO PIECE CHASSIS

FIELD OF THE INVENTION

The present invention relates to an electric cart, such as that for carrying the old or the disabled, and in particular to an electric cart having a chassis that is constituted by two separate and thus relatively movable pieces.

BACKGROUND OF THE INVENTION

In modern developed areas, automobiles have been widely used as a convenient transportation device. Due to the fact that the automobile consumes foil fuel and generates toxicant exhausts, the foil fuel engine automobiles have been partly replaced by electrically driven vehicles to reduce the air pollution. Some of the electrical vehicles are developed mainly for the old and/or the disabled to help them move in short distance and such an electric vehicle is basically designed with a light weight and moving with a low speed.

Since such an electric vehicle is designed for short distance and low speed, it is preferable that the electric vehicle to be easily carried to different locations when desired. For such a purpose, it is preferable the vehicle is comprised of detachable parts so as to facilitate disassembly thereof. Electric carts with multiple segment chassis structure are available in the market. The chassis segments are connected together by means of "insertion" of a portion of one segment into corresponding bore on the next chassis segment. This causes a misalignment or relative shifting problem when the chassis segments are re-assembled after being disassembled.

A related prior art of the multiple segment chassis electric cart is disclosed in Taiwan patent publication No. 176352. The present invention is made to provide a further improvement over the Taiwanese patent.

OBJECTS OF THE INVENTION

Therefore, an object of the present invention is to provide an electric cart having a two piece chassis wherein the two chassis pieces are detachably connected to each by means of a pivot rotatably received in two spaced recesses to form a rotatable coupling therebetween which allows the two chassis pieces to be readily assembled/disassembled.

Another object of the present invention is to provide an electric cart having a two piece chassis wherein a position retaining device is provided therebetween, comprisings an abutting member on one of the chassis piece and a counterpart support member on the other chassis piece to support the abutting action from the abutting member, which together with the rotatable coupling allows the two chassis pieces to be securely coupled together.

A further object of the present invention is to provide a securing device to secure the abutting member to the counterpart support member so as to prevent the chassis pieces from accidentally separating from each other.

To achieve the above objects, in accordance with the present invention, there is provided an electric cart comprising a first chassis member having a pivot axle fixed thereon and a second chassis member having two spaced recesses formed thereon to rotatably receive the pivot axle therein so as to form a rotatable coupling therebetween. An upright post is fixed on the first chassis member to support thereon a seat. Two spaced lugs is provided on the post. The second chassis member comprises an upright rod to support thereon an abutting member having an end sized to be received between the lugs. A cushion pad may be fixed to the end of the abutting member to provide a non-direct cushioned contact engagement between the upright post and the abutting member. The weight of the chassis members rotates the chassis members about the pivot axle in a direction to force the end of the abutting member to abut against the post. A steering system is provided on the first chassis member, comprising a handle stem rotatably mounted to the first chassis member to mechanically couple to at least one wheel rotatably supported on the first chassis member for steering the wheel. The second chassis member comprises a motor thereon to drive wheels mounted on the second chassis member.

BRIEF DESCRIPTION OF THE DRAWINGS

The present invention will be better understood from the following description of preferred embodiments thereof, which are illustrative and not limitative, with reference to the attached drawings, wherein.

DETAILED DESCRIPTION OF THE PREFERRED EMBODIMENTS

With reference to the drawings and in particular to FIGS. 1–5, wherein an electric cart constructed in accordance with the present invention is shown, the cart has a two piece chassis structure comprising a first chassis member 10 having a front side and a rear side and a second chassis member 30 having a front side and a rear side releasably connectable to the first chassis member 10 by means of a pivot axle 28 that is provided at the rear side of the first chassis member 10 rotatably received within axle holder means 35 provided on the front side of the second chassis member 30. Thus, the first chassis member 10 and the second chassis member 30 are rotatable about the pivot axle with respect to each other.

The first chassis member 10 comprises a steering system mounted at the front side thereof. The steering system comprises a handle having a handle stem 21 rotatably received and held within a stem holder that is fixed to the first chassis member 10, rendering the handle stem 21 rotatable with respect to the first chassis member 10. The handle stem 21 has a lower end to which a connection plate 22 is fixed so as to be rotatable in unison with the handle stem 21.

The first chassis member 10 also comprises two cylindrical wheel support members 24 which extend substantially vertically and are rotatably supported on the first chassis member 10. Each of the wheel support members 24 has a sideways axle 25 extending therefrom substantially in a horizontal direction for mounting a front wheel 26. Each of the wheel support members 24 has a sideways extension with a connection rod 27 rotatably connecting therebetween so that the first chassis member 10, the connection rod 27 and the sideways extensions of the wheel support members 24 constitute a first four bar linkage. One of the wheel support members 24 is connected to the connection plate 22 by means of a link 23 rotatably connected therebetween. This forms a second four bar linkage of which the input link is the connection plate 22 rotatably driven by the handle stem 21 and the output link is the connection rod 27. The connection rod 27 that constitutes the output link of the second linkage serves as the input link of the first linkage to drive the other connection rod 27 which serves as the output link of the first linkage to move in such a manner to be substantially parallel with and in unison with the input connection rod 27. This allows the two front wheels 26 to be steered substantially in the same direction, as indicated by phantom lines in FIG. 8.

It should be noted that the term "horizontal" or "horizontally" as used herein is intended to indicate the direction that is substantially parallel with a planar surface on which the cart is normally operated and moving along the surface. Similarly the term "vertical" or "vertically" is related to a direction substantially normal to the planar surface.

The pivot axle 28 that is mounted to the rear side of the first chassis member 10 is preferably an elongated cylindrical member extending in the horizontal direction, having a circular cross section. However, the cross section of the pivot axle 28 may have other shapes. An upright post 29 is also provided at the rear side of the first chassis member 10. The upright post 29 comprises two lugs 291 that extend in the rearward direction toward the second chassis member 30 and are laterally spaced from each other to define therebetween a spacing. The upright post 29 has a top end to which a seat A is mounted, preferably in a releasable manner.

The second chassis member 30 has a motor 31 fixed thereon to drive two rear wheels 34 via a speed reduction gear box 32. The gear box 32 has an output shaft 33 to two opposite end of which rear wheels 34 are attached to be driven thereby.

The axle holder means 35 that is provided at the front side of the second chassis member 30 comprises two spaced recesses respectively corresponding to and receiving therein two ends of the pivot axle 28 in such a way to allow the pivot axle 28 to be rotatable relative thereto. This provides a rotatable coupling between the two chassis members 10 and 30. Each of the recesses 35 is preferably provided with an end plate to abut against and thus limit axial movement of the pivot axle 28. This prevents the pivot axle 28 from accidentally sliding off the holder means 35 and separating the first chassis member 10 from the second chassis member 30.

The second chassis member 30 further comprises an upright rod 36 to support thereon an abutting member 37 which is preferably arranged to have a first end thereof receivable between the lugs 291 and an opposite second end fixed to the second chassis member 30, preferably at the rear side of the second chassis member 30. The first end of the abutting member 37 comprises a cushion pad 38 mounted thereon to be in contact engagement with the upright post 29 of the first chassis member 10 when the first end of the abutting member 37 is received between the lugs 291. The cushion pad 38 may be made of for example rubber or similar flexible material to prevent a direct contact between the abutting member 37 and the post 29 which may be made of metal and the direct contact therebetween causes noise. Such a rubber cushion pad also serves to provide a cushion effect between the abutting member 37 of the second chassis member 30 and the post 29 of the first chassis member 10.

The cushion pad 38 may be configured to have an axial extension forcibly fit into a bore formed on the first end of the abutting member 37 so as to be secured on the abutting member 37.

As an alternative, the cushion pad 38 may be eliminated from the abutting member 37 and this allows the abutting member 37 to directly contact the cushion pad 38. A noisy and uncomfortable condition may thus be present which, however, does not affect the function of the electric cart at all.

Figure 1:
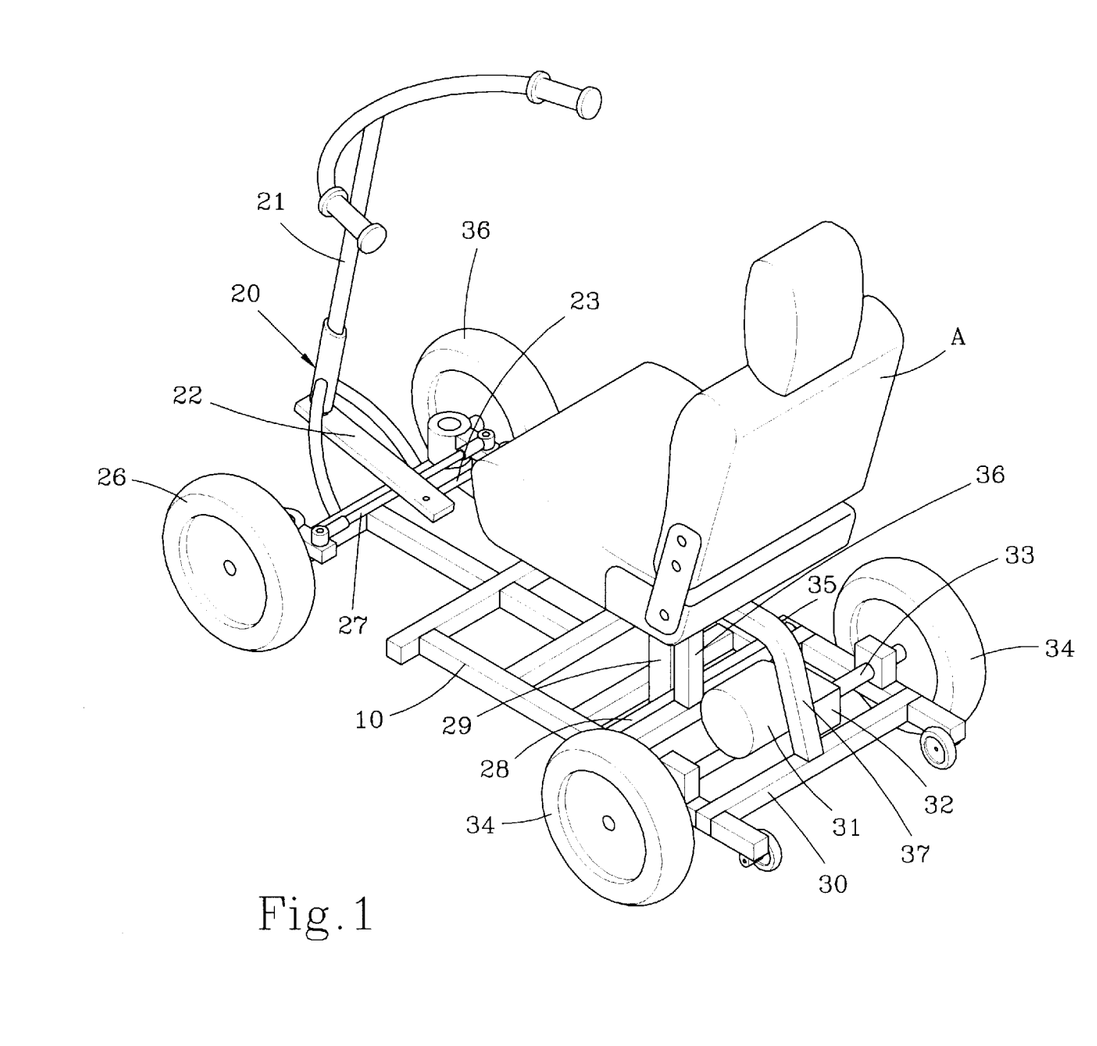
FIG. 1 is a perspective view showing an electric cart having a two piece chassis constructed in accordance with the present invention.
Figure 2:
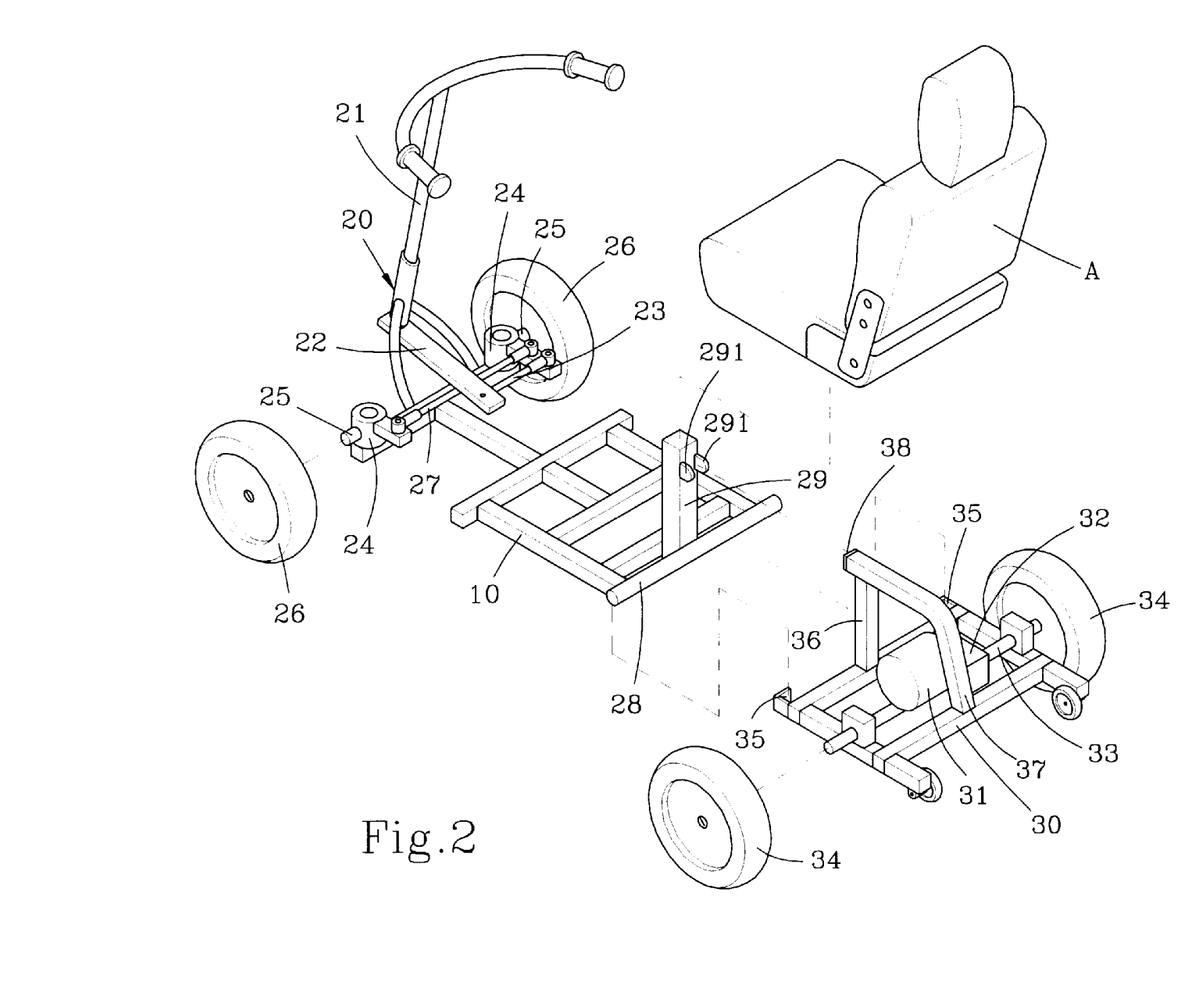
FIG. 2 is an exploded perspective view of the electric cart a two piece chassis constructed in accordance with a first embodiment of the present invention.
Figure 3:
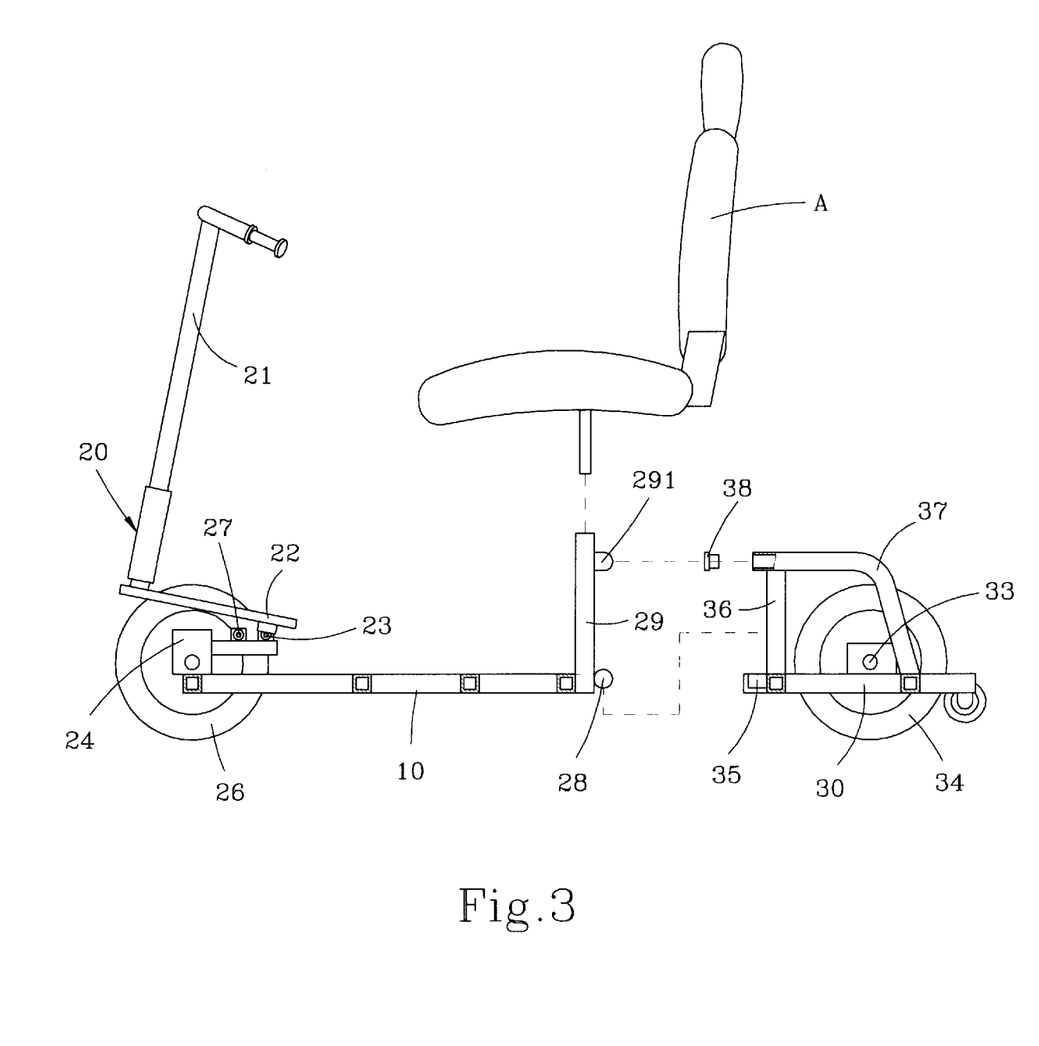
FIG. 3 is a side elevational view, partially sectioned and exploded, of the electric cart of the first embodiment of the present invention.
Figure 4:
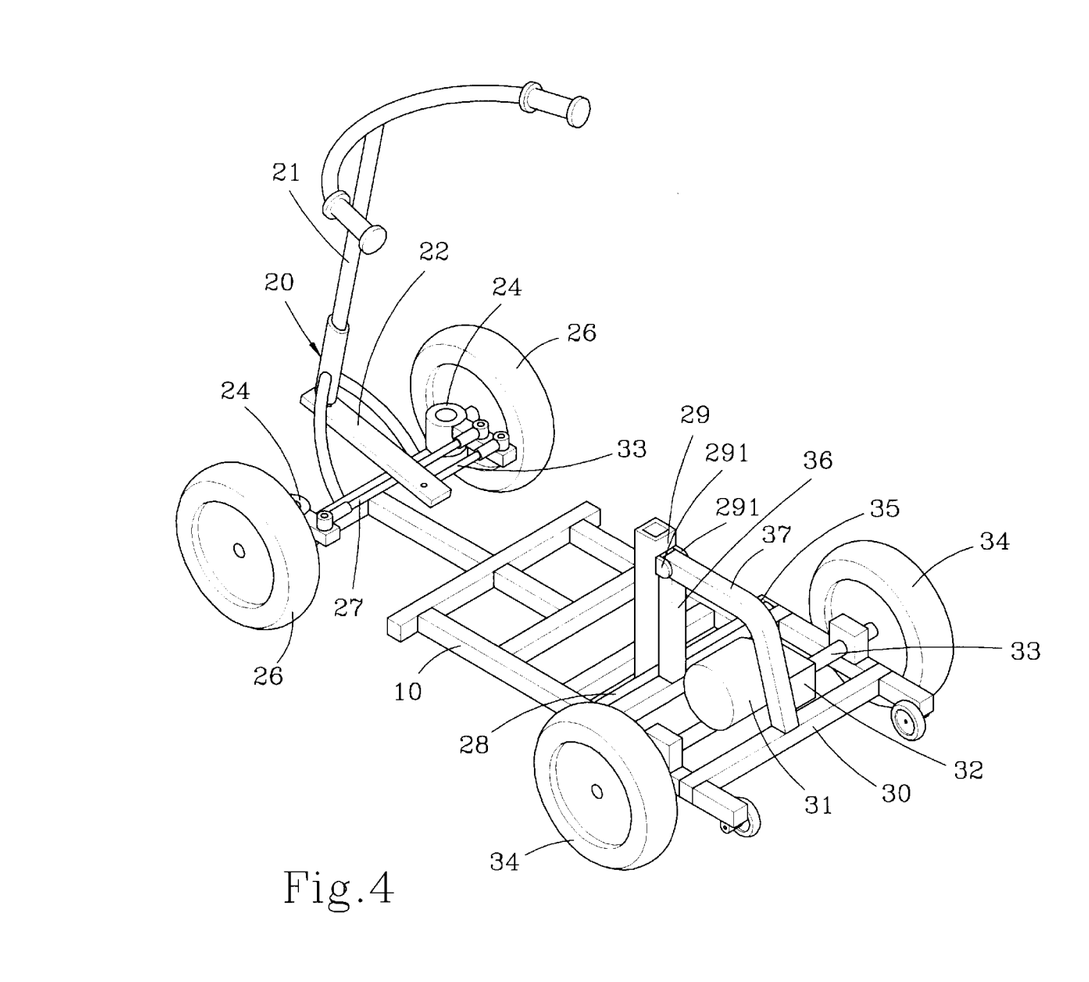
FIG. 4 is a perspective view of the electric cart in accordance with the first embodiment of the present invention with the seat removed.
Figure 5:
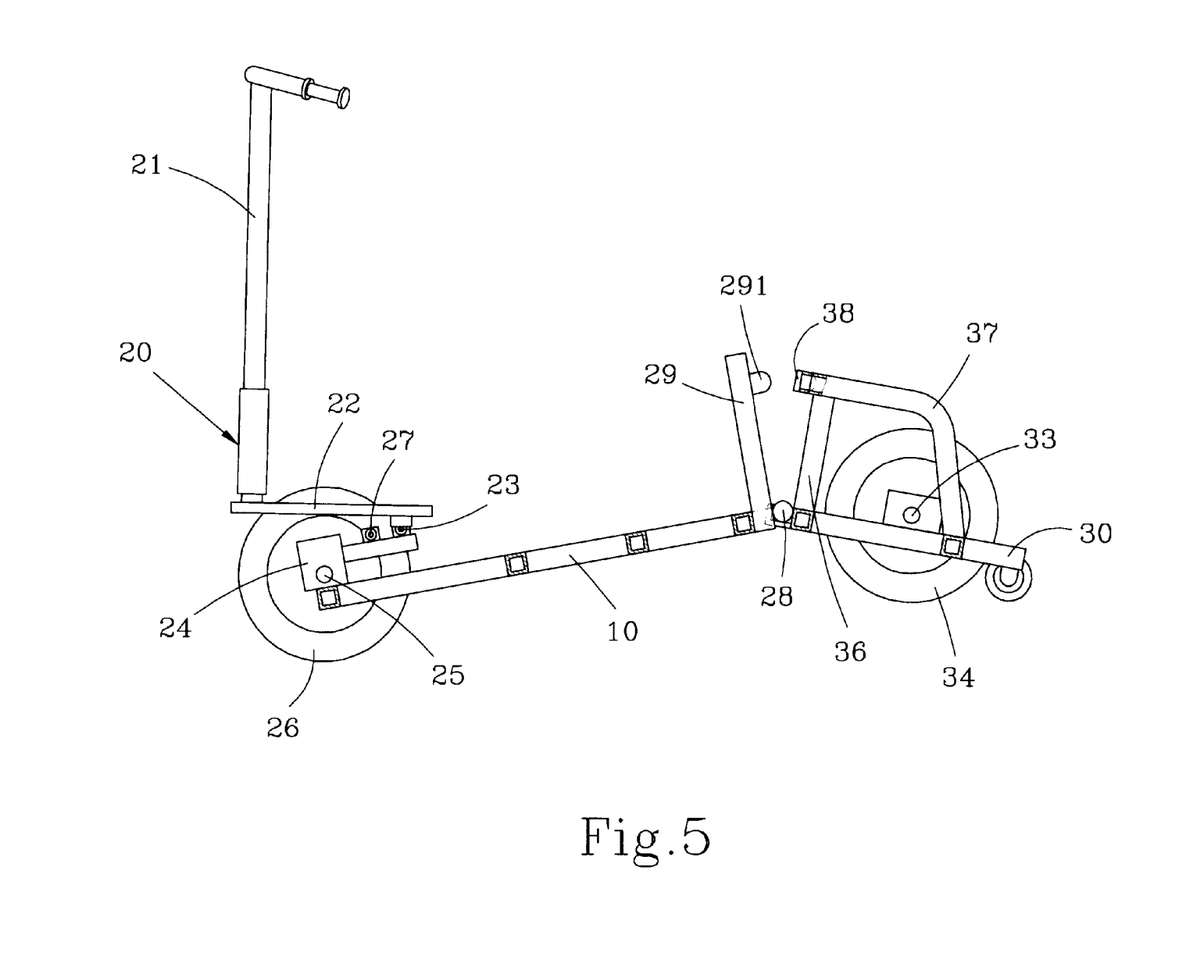
FIG. 5 is a side elevational view, partially sectioned, showing the assemblage of the first and second chassis members of the electric cart in accordance with the present invention.
Figure 6:
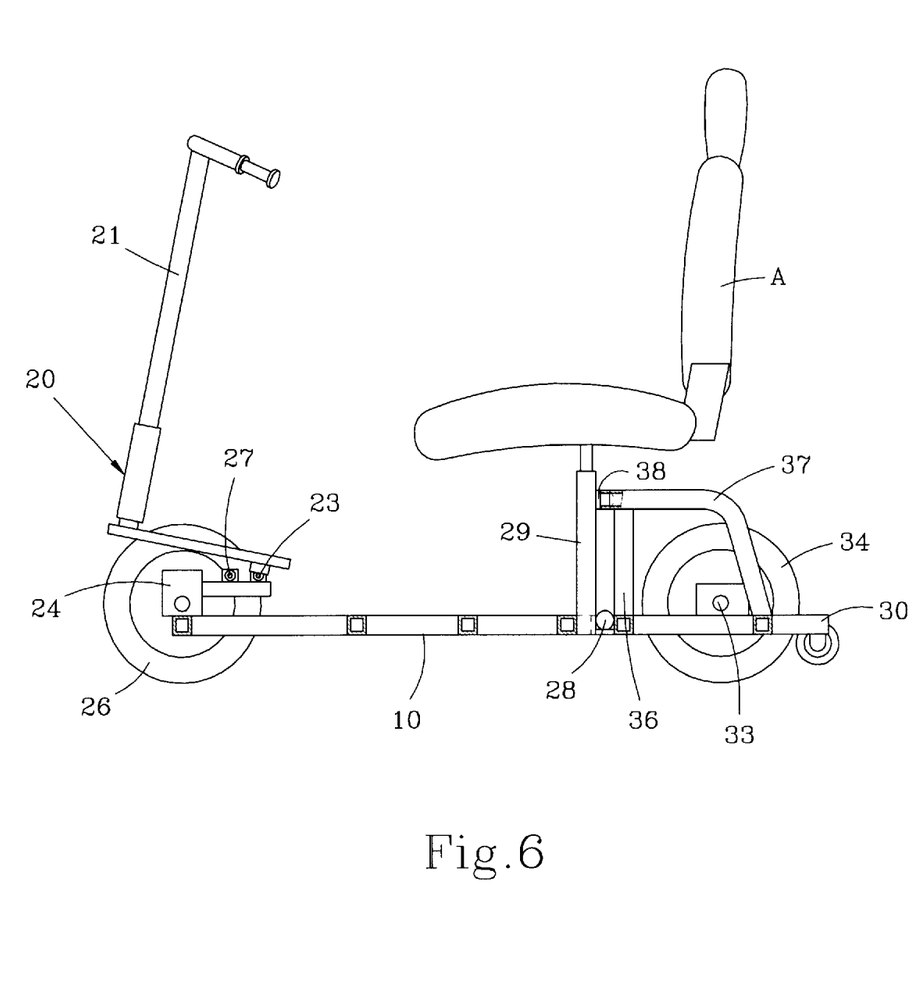
FIG. 6 is a side elevational view, partially sectioned, of the electric cart in accordance with the first embodiment of the present invention.
Figure 7:
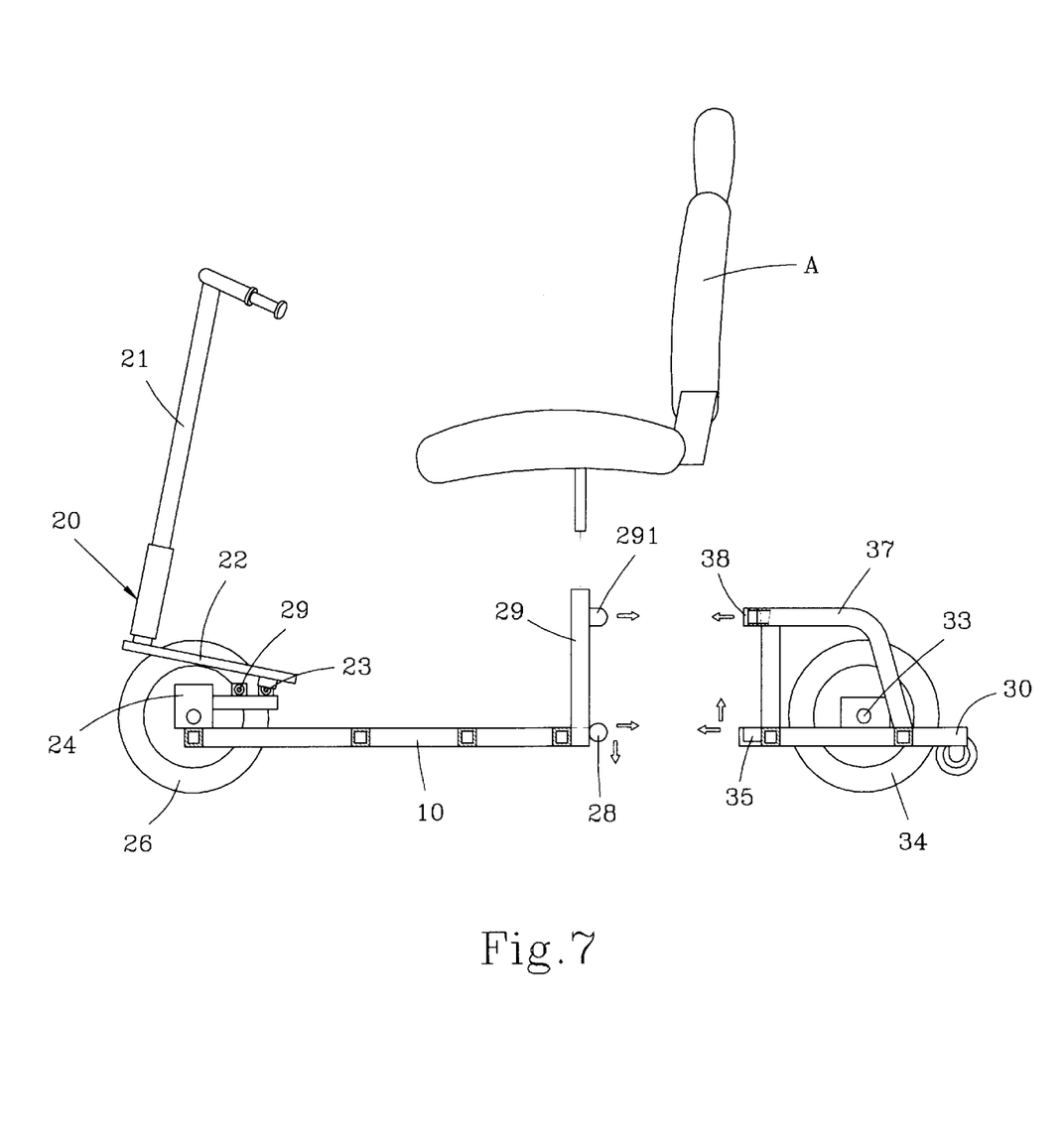
FIG. 7 is an exploded side elevational view, partially sectioned, showing the electric cart in accordance with the first embodiment of the present invention.

FIGS. 6 and 7 show side elevational views for both connected and separated conditions of the cart chassis of the present invention. As shown in FIG. 6, the first chassis member 10 is connected to the second chassis member 7 by inserting the ends of the pivot axle 28 of the first chassis member 10 into the holding recesses 35 formed on the second chassis member 30 to allow the second chassis member 30 to be rotatable relative to the first chassis member 10 (see FIG. 5). By rotating the second chassis member 30 relative to the first chassis member 10 in such a manner to bring the first end of the abutting member 37 to which the cushion pad 38 is mounted into between the lugs 291 of the post 29, the second chassis member 30 is secured in the connected condition with respect to the first chassis member 10. The cushion pad 38 may be sized to provide a forcible and frictional engagement with the lugs 291.

By means of the weight of a user seated on the seat A and/or the gravity of the chassis itself, a force in the downward vertical direction is applied to the first chassis member 10 (probably via the post 29, if one is seated thereon), causing a relative rotation between the first chassis member 10 and the second chassis member 30 about the pivot axle 28 in such a direction to have the first end of the abutting member 37 more forcibly abut against the post 29 with the cushion pad 38 (if any) squeezingly sandwiched therebetween, as indicated by the arrows in FIG. 7. The first end of the abutting member 37 is constrained by the lugs 291 of the post 29 in the transverse or lateral direction so that no significant shaking may occur therebetween.

Figure 8:
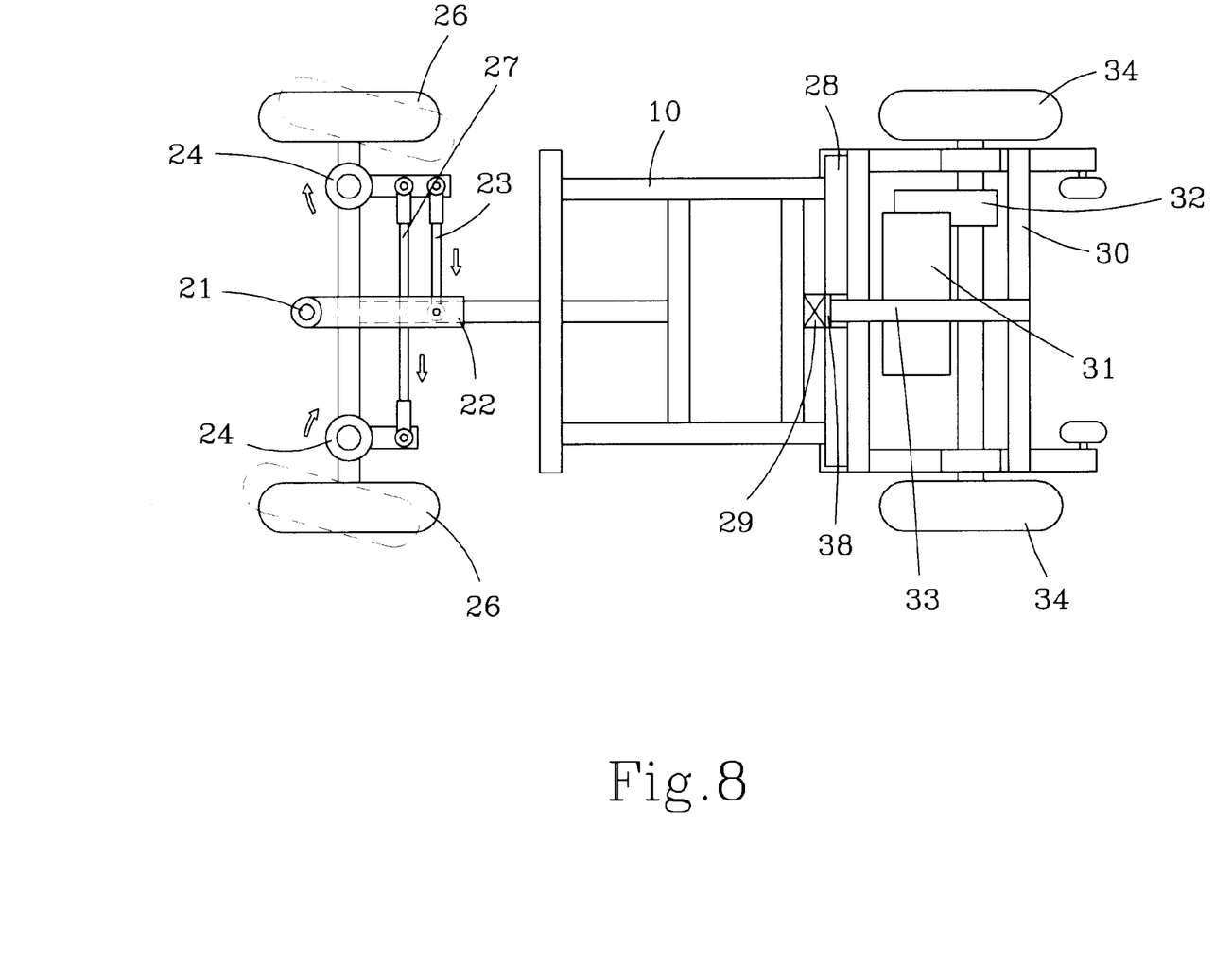
FIG. 8 is a top plan view of the electric cart chassis in accordance with the present invention.

With reference to FIG. 8, which shows the operation of the steering system of the cart in accordance with the present invention, as discussed previously, the steering system comprises two four bar linkages which simplify the structure of the steering system, while achieve a precise steering operation.

Figure 9:
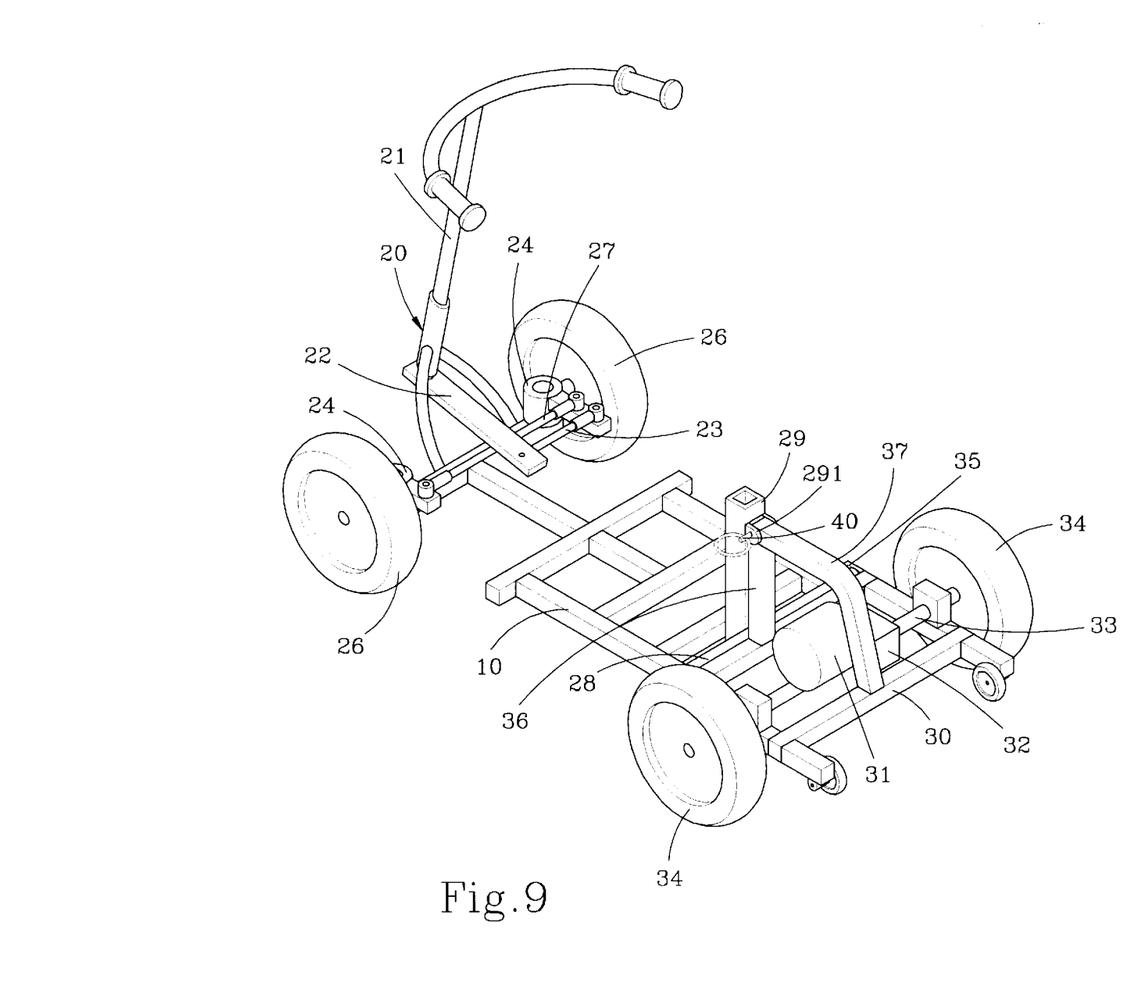
FIG. 9 is a perspective view showing an electric cart incorporating a two piece chassis constructed in accordance with a second embodiment of the present invention, with the seat removed for simplicity.
Figure 10:
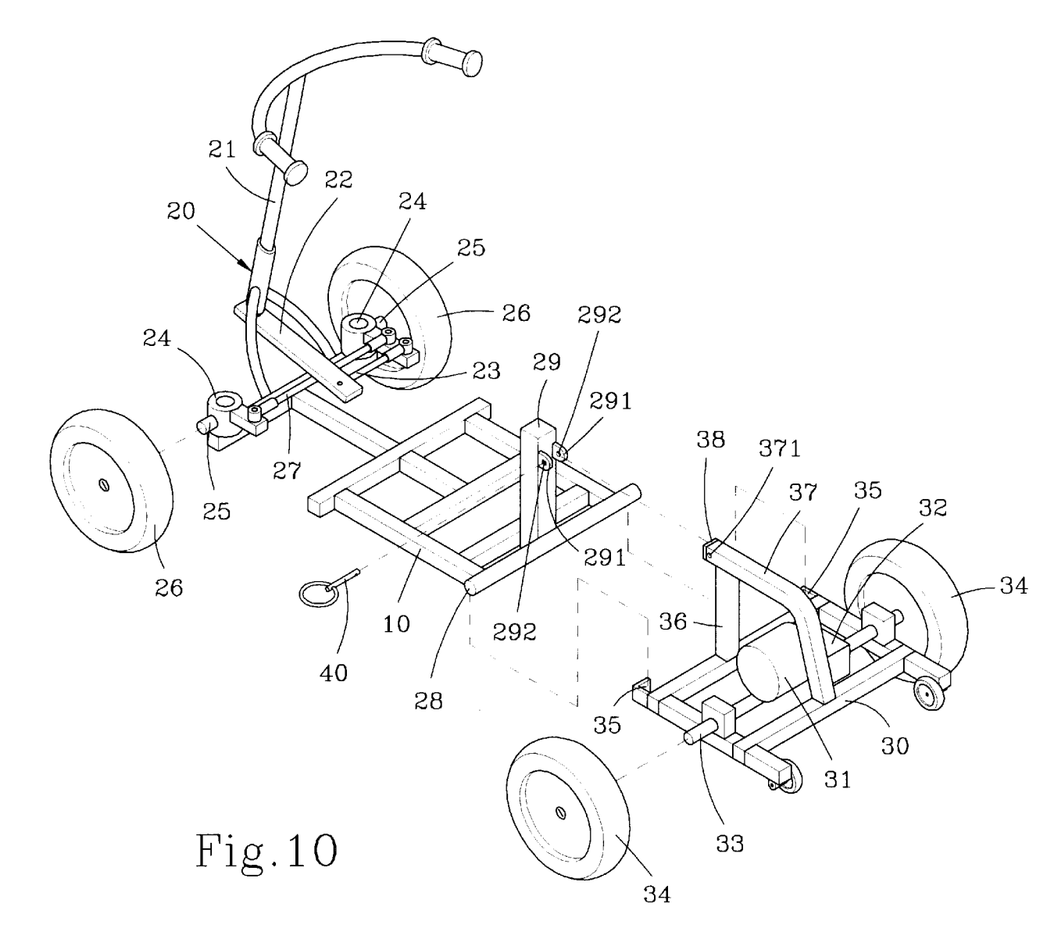
FIG. 10 is exploded perspective view of the electric cart in accordance with the second embodiment of the present invention, the seat being removed for simplicity.

With reference to FIGS. 9 and 10, wherein a second embodiment of the electric cart in accordance with the present invention is shown, the second embodiment cart is in general identical to that of the embodiment illustrated in FIGS. 1–8 with a difference in that the second embodiment cart comprises a securing pin 40 which extends through aligned holes 292 formed on the lugs 291 and a corresponding hole 371 formed on the first end of the abutting member 37 to prevent the abutting member 37 from accidentally separating from the lugs 291. If desired, the hole 371 or the holes 292 may be formed as elongated slot(s) to accommodate the relative movement between the abutting member 37 and the post 29 when a user sits down on the seat A.

Alternatively, the pin 40 may be threaded so as to be engageable by a nut (not shown) for more securely holding the abutting member 37 and the post 29 together while maintaining the releasibility of the abutting member 37 (as well as the second chassis member 30) from the post 29 (as well as the first chassis member 10).

Figure 11:
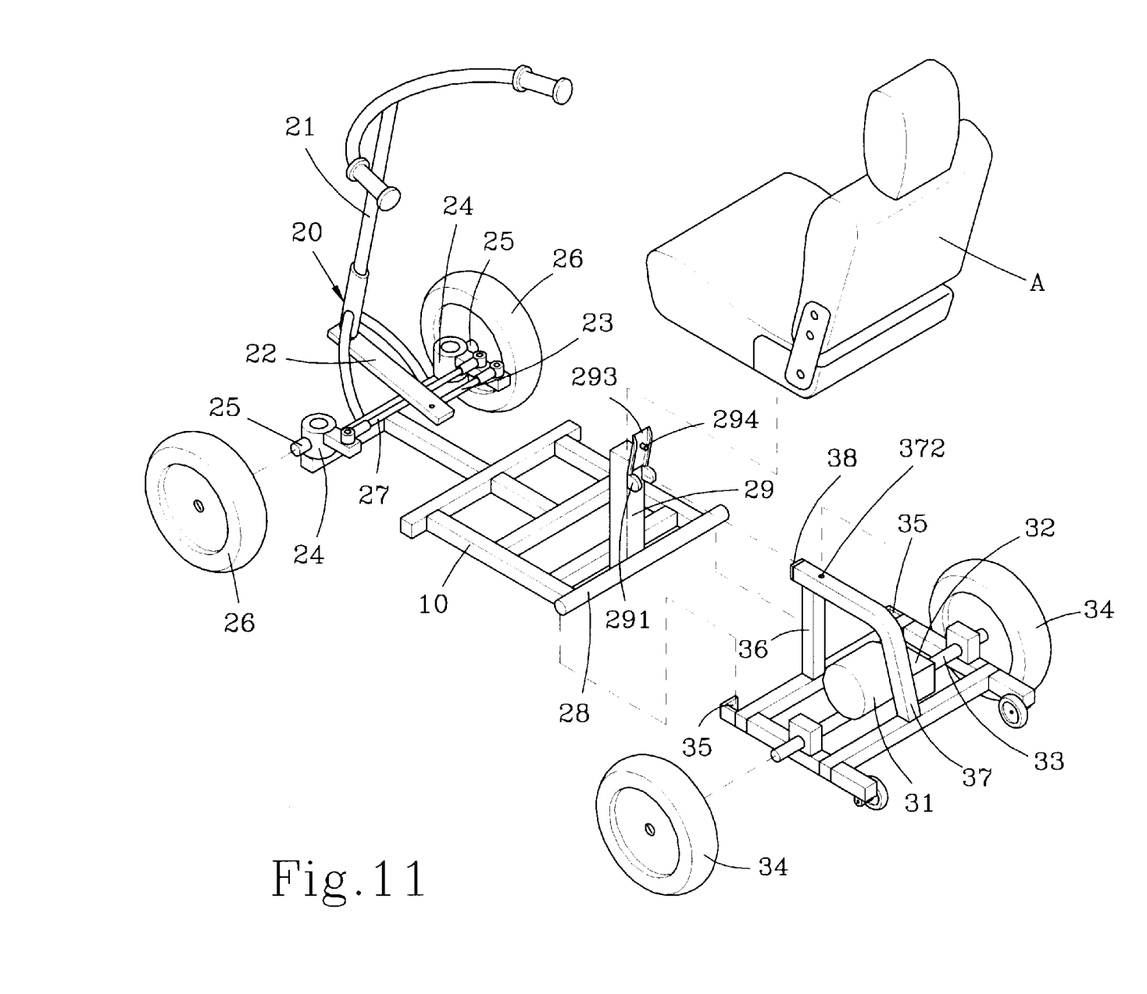
FIG. 11 is an exploded perspective view showing an electric cart incorporating a two piece chassis constructed in accordance with a third embodiment of the present invention.
Figure 12:
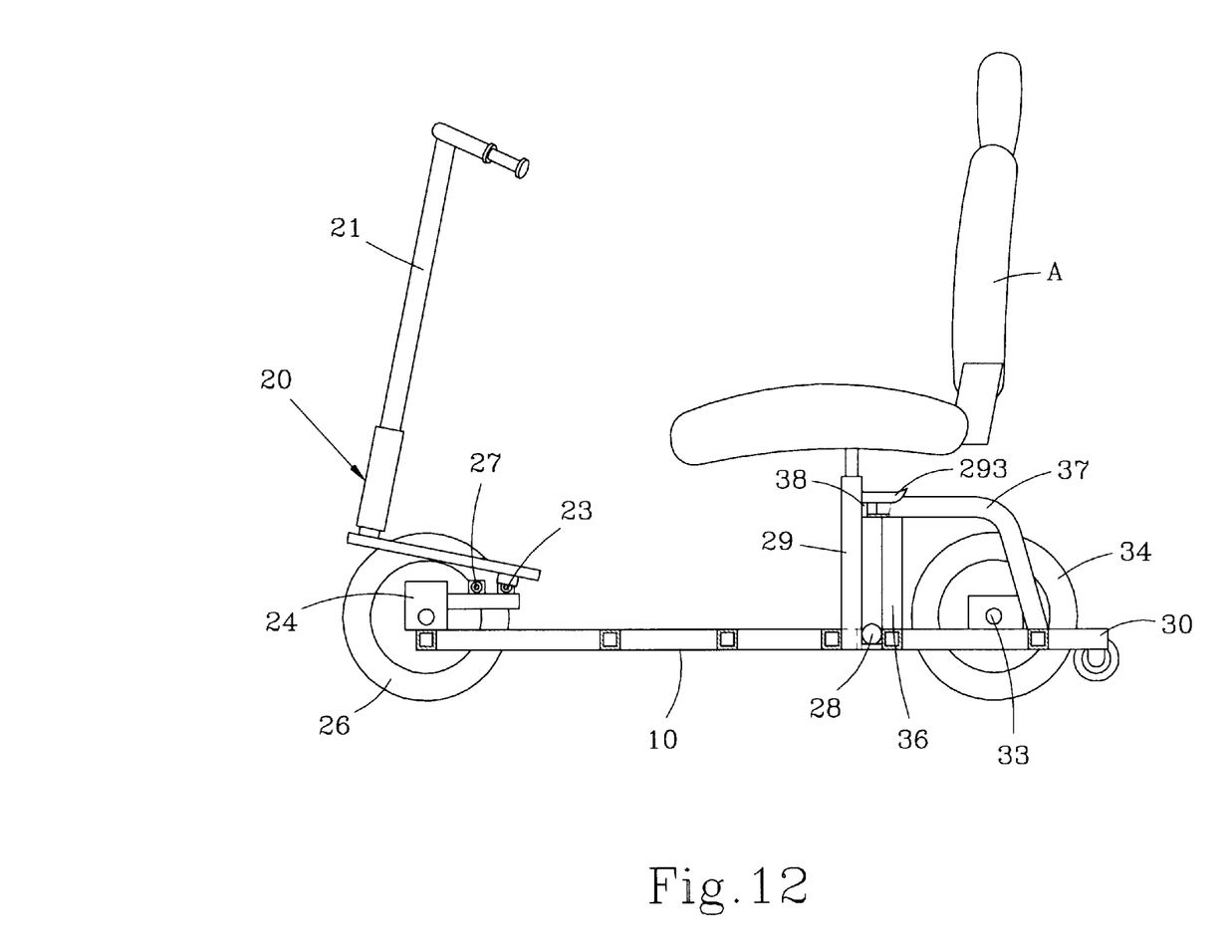
FIG. 12 is a side elevational view, partially sectioned, showing the electric cart in accordance with the third embodiment of the present invention.

In FIGS. 11 and 12, a further embodiment of the electric cart in accordance with the present invention is shown, which is different from the embodiment shown in FIGS. 1–8 in that securing means is provided to more securely connect the abutting member 37 between the lugs 291 of the post 29, which comprises a tab 293 pivotally mounted to the post 29 at a location above the lugs 291 to be movable toward/away from the abutting member 37. The tab 293 comprises a peg 294 provided thereon in such a manner that when the tab 293 is substantially horizontal, the peg 294 extends downward from the tab 293. Corresponding to the peg 294, the first end of the abutting member 37 is provided with a hole 372 sized to receive the peg 294 therein so that when the first end of the abutting member 37 is received between the lugs 291 of the post 29, the tab 293 is rotatable to have the peg 294 fit into the hole 372. This allows the abutting member 37 to be more securely connected to the post 29. The pivotal connection between the tab 293 and the post 29 allows the tab 293 to move relative to the abutting member 37 and thus remove the peg 294 out of the hole 372 for releasing the abutting member 37 from the post 29.

Although it has been described that the pivot axle is provided on the first chassis member 10 and the holding recesses 35 are on the second chassis member 30, it is quite apparent that they may be switched with each other, namely the pivot axle on the second chassis member and the holding recesses on the first chassis member.

Also, it is possible to form a horizontal extension from the post 29 with/without a cushion pad provided on a free end of the extension and in this case, the first end of the abutting member 37 is provided with two spaced walls or lugs to receive the horizontal extension of the post therebetween.

Figure 13:
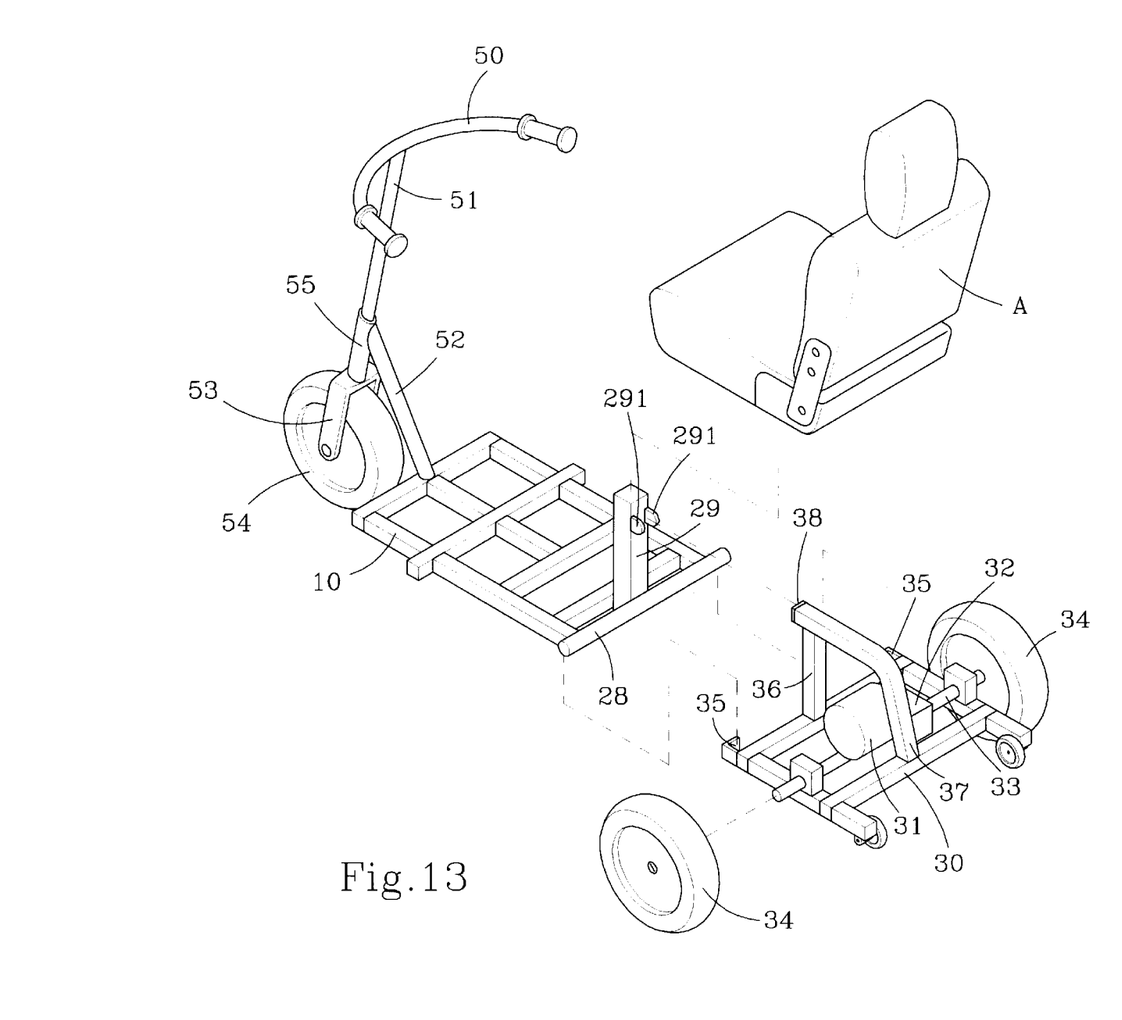
FIG. 13 is an exploded perspective view showing an electric cart incorporating a two piece chassis constructed in accordance with a fourth embodiment of the present invention.
Figure 14:
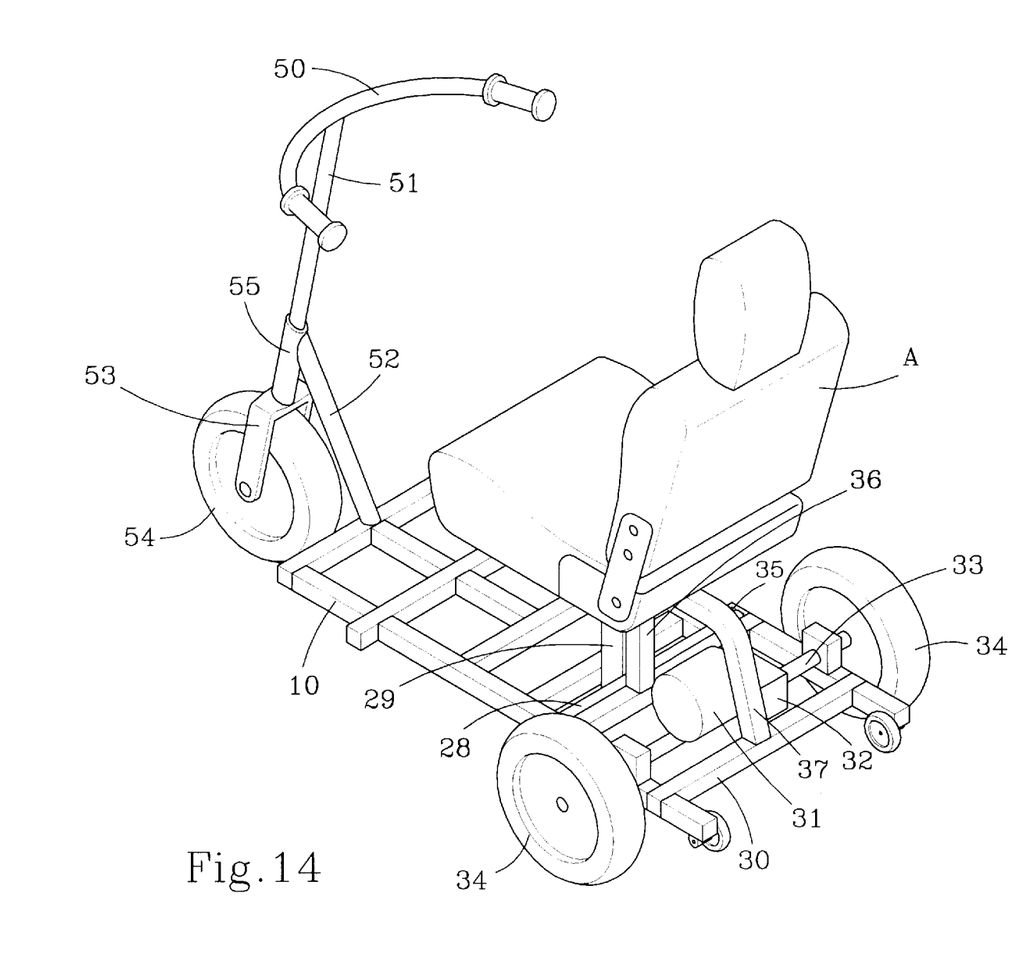
FIG. 14 is a perspective view showing the electric cart of the fourth embodiment of the present invention.
Figure 15:
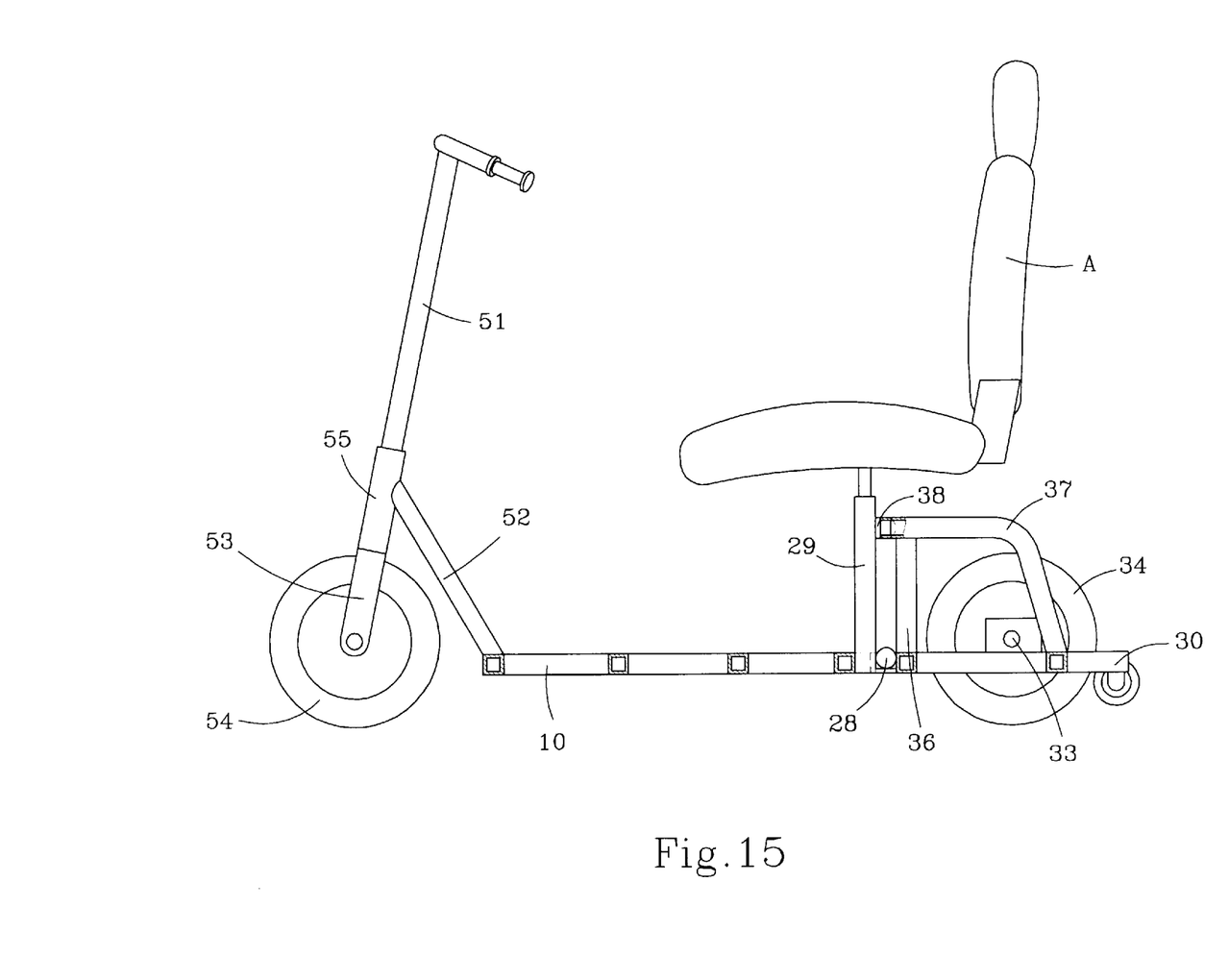
FIG. 15 is a side elevational view, partially sectioned, showing the electric cart in accordance with the fourth embodiment of the present invention.

Although it is shown in the previous embodiments that the cart that embodies the present invention is a four wheel cart, it is possible to embody the present invention by means of a three wheel cart. An example of the three wheel cart is shown in the fourth embodiment illustrated in FIGS. 13–15, wherein the steering system which is designated at 50 comprises a handle stem 51 rotatably supported within a stem holder 55 which may be fixed to the first chassis 10 by means of a bar 52 or other structure. The handle stem 51 has a lower end to which a fork 53 is fixed to rotatably support a front wheel 54 so that by rotating the handle stem 51 about the stem holder 55, the front wheel 54 may be driven to any desired direction. The remaining portion of the three wheel cart is similar to the four wheel carts discussed with reference to FIGS. 1–12 so that no further description is needed herein.

It is apparent that although the present invention is illustrated with the description of the preferred embodiments thereof, it is contemplated that there may be changes and modifications in the described embodiments that can be carried out without departing from the scope of the invention which is intended to be limited only by the appended claims.

What is claimed is:

1. An electric cart comprising:

a chassis comprises two chassis members detachable from each other, each of the chassis members having at least one wheel rotatably supported thereon;

a steering system rotatably mounted on one of the chassis members and in mechanically driving coupling with the at least one wheel associated with the one of the chassis member;

coupling means for releasably coupling the chassis members to each other, comprising a rotatable connection provided between the chassis members to allow the chassis members to be rotatable with respect to each other about the rotatable connection and securing means for releasably securing the chassis members together in a desired rotational position with respect to each other; and a seat releasably mounted to one of the chassis members.

2. The electric cart as claimed in claim 1, wherein the rotatable connection of the coupling means comprises a pivot axle fixed to a first one of the chassis members to be rotatably received and held in at least one receiving/holding recess formed on a second one of the chassis members.

3. The electric cart as claimed in claim 1, wherein the securing means of the coupling means comprises an upright post fixed to a first one of the chassis members and extending upright therefrom, having a pair of lugs formed thereon and spaced from each other to define a spacing therebetween and an abutting member fixed to a second one of the chassis members having an end positioned and sized to be receivable within the lugs to abut against the upright post when the first chassis member is in the desired rotational position with respect to the second chassis member.

4. The electric cart as claimed in claim 1, wherein the steering system comprises a steering handle stem rotatably mounted to the chassis member mechanically coupled to the at least one wheel by means of a coupling mechanism to control the direction of the wheel.

5. The electric cart as claimed in claim 3, wherein each of the lugs provided on the upright post comprises a hole formed thereon to be substantially aligned with each other and wherein the end of the abutting member has a lateral hole formed thereon to be corresponding to the holes of the lugs so that when the end of the abutting member is received between the lugs, a pin is receivable through both the holes of the lugs and the hole of the abutting member to secure the abutting member to the lugs.

6. The electric cart as claimed in claim 3, wherein the end of the abutting member comprises a hole formed thereon and wherein the upright post comprises a laterally extending tab pivoted thereto to be movable toward/away from the abutting member when the end of the abutting member is received between the lugs, the tab having a peg which is position and sized to be receivable within the hole of the abutting member to releasably secure the abutting member to the upright post.

7. The electric cart as claimed in claim 1, wherein the abutting member comprises a cushion pad mounted to the end thereof to provide a non-direct, cushioned contact engagement between the end of the abutting member and the upright post.

8. The electric cart as claimed in claim 7, wherein the cushion pad is made of rubber.

9. The electric cart as claimed in claim 1, wherein a motor is fixed on one of the chassis members and drivingly coupled to the at least one wheel associated with the one of the chassis members.

10. The electric cart as claimed in claim 2, wherein the second chassis member comprises end stops which are positioned associated with two axial ends of the pivot axle to prevent the pivot axle from accidently sliding of the receiving/holding recess.

11. The electric cart as claimed in claim 10, wherein the second chassis member comprises two receiving/holding recesses formed to receive the pivotal axis therein.

12. The electric cart as claimed in claim 4, wherein the coupling mechanism comprises a connection plate fixed to the handle stem to be rotatable in unison therewith, a wheel support member rotatably mounted on the chassis member and having a laterally extending axle for rotatably mounting one wheel associated with the chassis member, one of the wheel support members being connected to the connection plate by means of a link which is rotatably connected to both the connection plate and the one of the wheel support members, a connection rod extending between the wheel support members and rotatably connected to both wheel support members.

13. The electric cart as claimed in claim 4, wherein the coupling mechanism comprises a fork fixed to the handle stem to be rotatable in unison therewith with the at least one wheel being rotatably supported within the fork.

\* \* \* \* \*